(12) United States Patent
Berry et al.

(10) Patent No.: US 9,723,695 B1
(45) Date of Patent: Aug. 1, 2017

(54) POWER LINE COMMUNICATION METHOD AND APPARATUS USING DOWNSTREAM CURRENT MODULATION

(71) Applicant: Universal Lighting Technologies, Inc., Madison, AL (US)

(72) Inventors: Travis L. Berry, Madison, AL (US); John Cavacuiti, Burnaby (CA); Rob Mahaffey, Burnaby (CA); Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 14 days.

(21) Appl. No.: 14/927,106

(22) Filed: Oct. 29, 2015

Related U.S. Application Data

(60) Provisional application No. 62/074,752, filed on Nov. 4, 2014.

(51) Int. Cl.
 *H05B 37/02* (2006.01)
(52) U.S. Cl.
 CPC ..... *H05B 37/0263* (2013.01); *H05B 37/0227* (2013.01)
(58) Field of Classification Search
 None
 See application file for complete search history.

(56) References Cited

U.S. PATENT DOCUMENTS

| | | | | |
|---|---|---|---|---|
| 5,668,446 A | * | 9/1997 | Baker | H05B 37/02 315/158 |
| 6,608,552 B1 | * | 8/2003 | Fogel | H04L 27/30 340/12.32 |
| 8,274,232 B2 | * | 9/2012 | Nerone | H04B 3/544 315/209 R |
| 2012/0161666 A1 | * | 6/2012 | Antony | H05B 33/0809 315/294 |
| 2013/0181630 A1 | * | 7/2013 | Taipale | H05B 37/0263 315/224 |

* cited by examiner

*Primary Examiner* — Douglas W Owens
*Assistant Examiner* — James H Cho
(74) *Attorney, Agent, or Firm* — Patterson Intellectual Property Law, PC; Mark J. Patterson; Gary L. Montle (57) ABSTRACT

A lighting control system is provided with a communication method utilizing downstream current modulation. A primary controller is electrically coupled to a plurality of lighting devices via a mains power transmission network. Each of the respective lighting devices includes an occupancy sensor and is configured to provide full illumination when occupancy is detected in the associated area. The controller identifies occupancy by an increase in current on the mains lines, directs the other devices to fully illuminate, and activates a timer. Prior to lapsing of the timer, any of the devices may indicate continued occupancy by adjusting an operating current to a respective light source according to a predetermined pattern. Upon identifying the pattern, the controller generates control signals directing each of the other devices to remain fully illuminated, and resets the timer. The predetermined pattern may for example include amplitude modulation, threshold numbers of cycles, or both.

18 Claims, 7 Drawing Sheets

POWER LINE COMMUNICATION METHOD AND APPARATUS USING DOWNSTREAM CURRENT MODULATION

CROSS-REFERENCES TO RELATED APPLICATIONS

This application claims benefit of U.S. Provisional Patent Application No. 62/074,752, filed Nov. 4, 2014, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to devices, systems and methods for providing illumination control. More particularly, the present invention relates to systems capable of detecting occupancy and accordingly regulating an illumination level in a defined area.

Lighting control systems are known in the art which receive and implement occupancy information in order to regulate lighting output accordingly. The use of occupancy sensors in lighting control has been on a steady rise as the industry advances towards more aggressive energy conservation measures. Conventional occupancy sensors are known which utilize various detection methods for detecting occupancy in a defined area. Among the known methods, passive infrared (PIR), microwave Doppler shift, ultrasonic Doppler shift, and audio sensors are the most common.

Passive infrared (PIR) sensors are considered to be the most common type of occupancy sensor. They are able to "see" heat emitted by occupants, and triggering occurs when a change in infrared levels is detected, such as when a warm object moves into or out of view with respect to the sensor's eyes. PIR sensors are very resistant to false triggering. Although some PIR sensors have an operating range of up to 35 feet in specific directions under ideal conditions, they are most reliable within a 15-foot range. This is due to the blind spots between their wedge-shaped sensory patterns becoming wider with increasing distance. The sensor is most sensitive to movements laterally across the field of view. They are passive, meaning that they do not send out any signal, and depend on the intensity of the heat from the moving part of the subject, which attenuates by the square of the distance.

PIR occupancy sensors typically use PIR elements with two to six areas. Fresnel lenses focus a projection of the defined area on the PIR element. Output of each area on the PIR element is amplified electronically. Differential amplification is used so that a higher common-mode rejection ratio (CMRR) may be achieved. The CMRR is a measure the tendency of a device to reject input signals common to both input leads, and is defined as the ratio of the powers of the differential gain over the common-mode gain, as measured in positive decibels. In other words, differences between values of different areas of the PIR element are amplified and the common factor, which is present due to IR emissions from other surfaces and objects, is rejected in the amplifier. Thus, once a heat-emitting source crosses the sensitive areas, the projection is drifted from one PIR area to another. This will result in a pulse at the output of the amplifier. The pulse is then compared to a desired threshold to filter the effect of thermal and electronic noises. Various coverage patterns can be achieved via modifications to the construction of the Fresnel lens.

There has been an extensive amount of research and development conducted to implement and improve performance and accuracy of occupancy detection. Accordingly, various sensing technologies employ two or more detection methods in a single system to reduce false tripping. Dual technology occupancy sensors generally use an active sensing method in combination with a PIR element. Microwave and ultrasound are widely used active sensing technologies. Both methods rely on processing Doppler shifts between the frequency of transmitted and reflected signals.

To achieve a completely passive dual technology sensor, a design as previously known in the art employs a PIR sensor as a primary detector and a microphone as a secondary detector. This enhances the accuracy of the sensor through detecting spontaneous changes in the amplitude of the noise in the defined area. The signal from the microphone used in this sensor is amplified by an automatic gain control amplifier, and accordingly consistent background noises are filtered out. The microphone module is activated by the PIR module, or in other words the lights will be turned on when the PIR element senses a motion. Once in the ON state, either one of the PIR or microphone modules will keep the lights in the ON state. Once motion has not been sensed for a predetermined period of time (timeout), the lights will be put into the OFF state and a grace period timer may be activated. During this grace period, the lights could be reverted into the ON state by a signal from the microphone as well as from the PIR module. Once in the OFF state, the microphone will not regulate the lights into the ON state. It is the PIR module that re-initiates the ON state and also activates the microphone.

However, occupancy sensors and associated systems or networks as are conventionally known in the art still typically share a common failure regarding false triggering. This is particularly true where multiple light fixtures and associated lighting devices are networked together across a plurality of independently defined areas within a collective area such as a parking garage. For example, sensors in a first area may likely fail to detect occupants in a second area and trigger the lights off while the collective area is still occupied.

Figure 1:
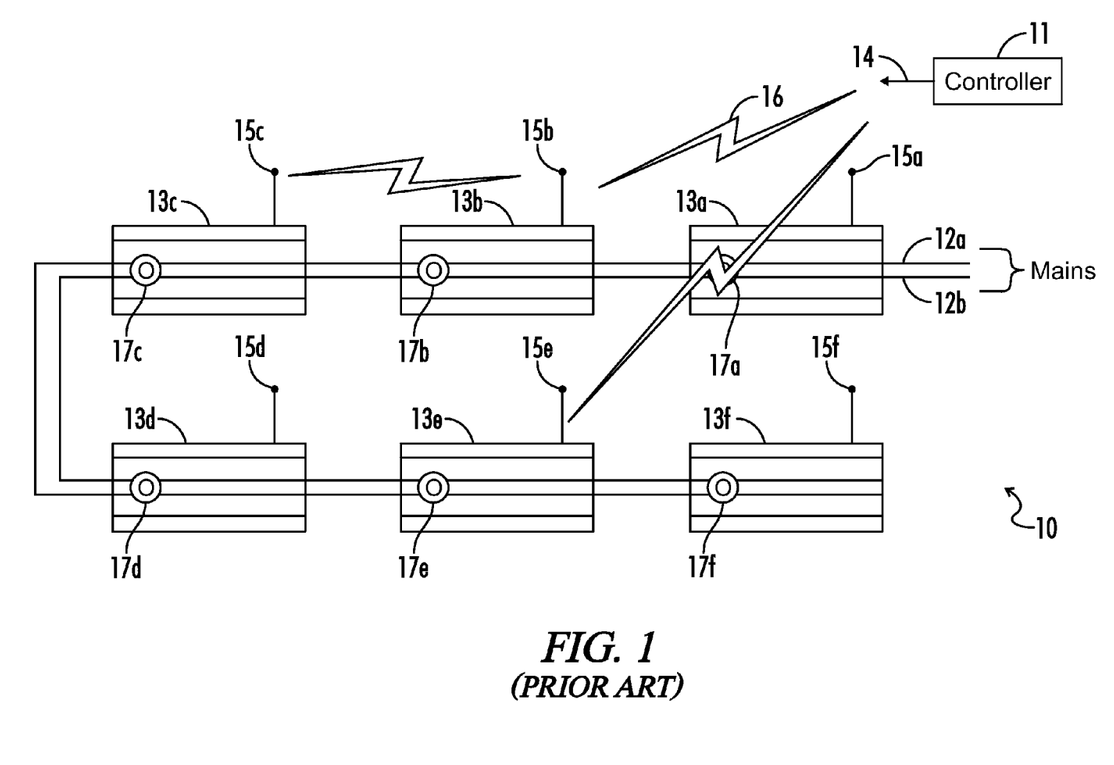
FIG. 1 is a block diagram representing a first example of a conventional lighting control system including occupancy sensors.

In one conventional example, a wireless system 10 (point-to-point or mesh) may be employed as represented in FIG. 1. A primary controller 11 as shown includes a transceiver 14 operatively linked via a bi-directional wireless communications network 16 to respective transceivers 15a-15f for each of a plurality of lighting devices 13a-13f. The devices 13a-13f each receive mains power from mains wires 12a, 12b, and also include a respective one of a plurality of occupancy sensors 17a-17f. However, there are numerous disadvantages to such a configuration. Guaranteeing coverage for wireless RF is sometimes difficult due to construction and distances between devices, wherein potential attenuation and multipath problems may typically arise. Mesh networks also generally require commissioning and are often difficult to troubleshoot.

Figure 2:
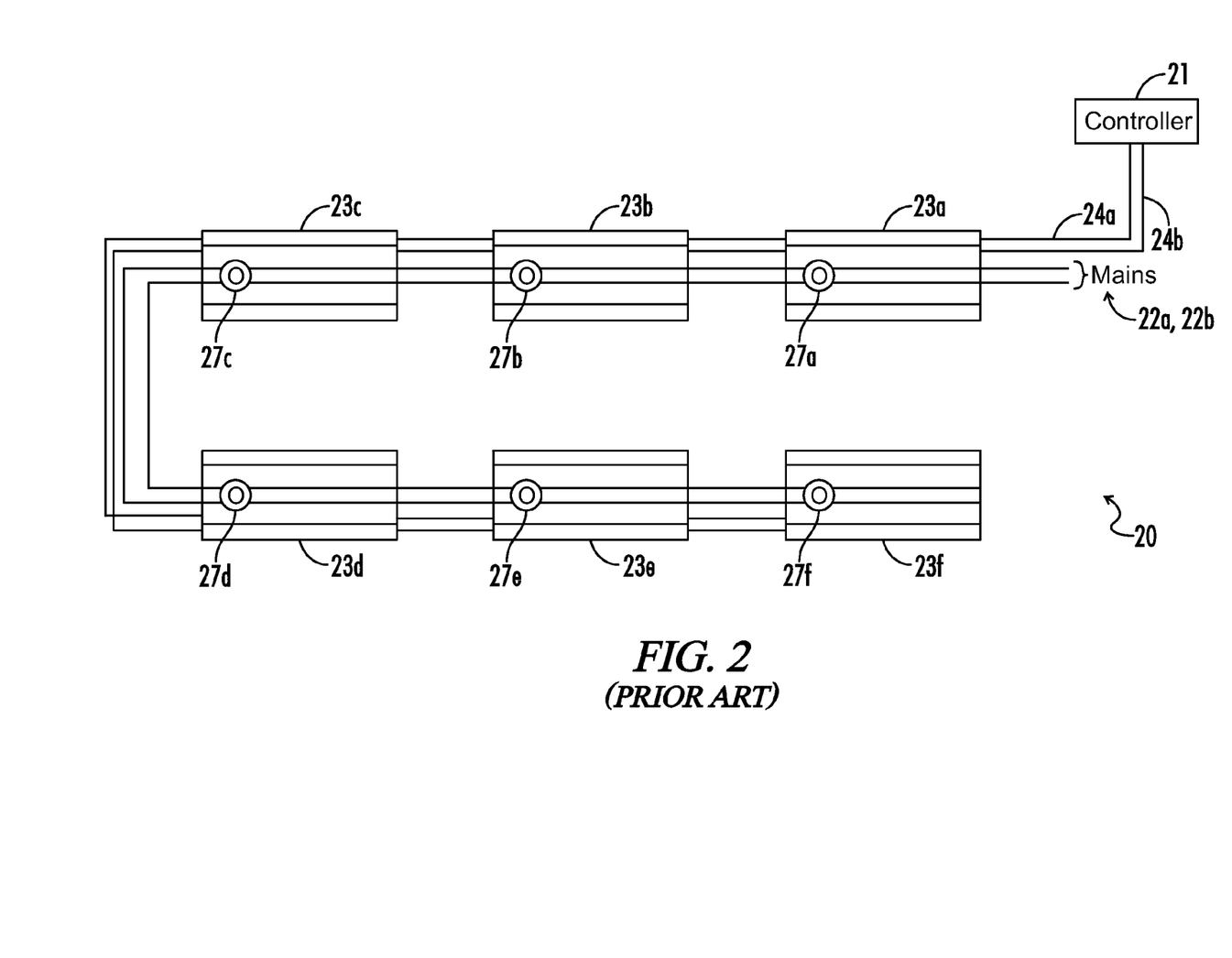
FIG. 2 is a block diagram representing a second example of a conventional lighting control system including occupancy sensors.

In another conventional example, a system 20 as represented in FIG. 2 may be provided with dedicated control wires 24a, 24b extending from a primary controller 21 to each of the plurality of lighting devices 23a-23f. However, this configuration also includes numerous disadvantages, including but not limited to the cost of material and labor to run dedicated control wires. It also may not be possible to run control wires in retrofit applications.

Figure 3:
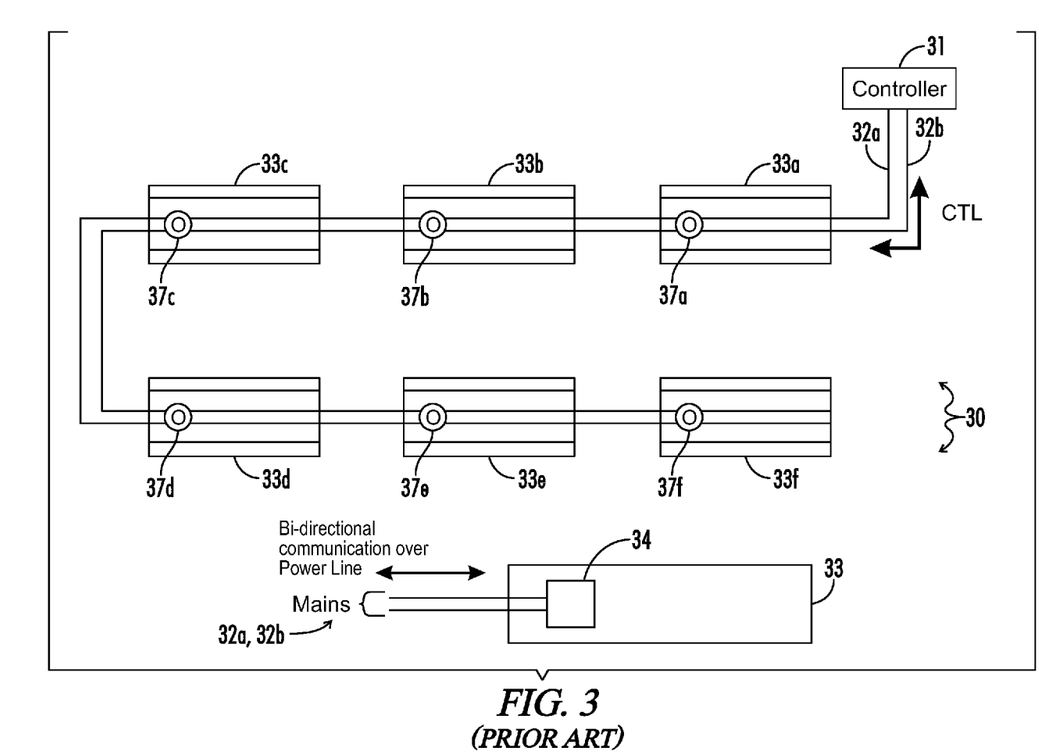
FIG. 3 is a block diagram representing a third example of a conventional lighting control system including occupancy sensors.

In still another conventional example, a system 30 as represented in FIG. 3 is provided with control signals imposed via bi-directional power line communications (via mains wires 32a, 32b). However, disadvantages to this configuration include but are not limited to the cost of the bidirectional communication modems 34 needed in the controller 31 and at each luminaire 33. The integrated circuits which would typically support such an approach are relatively expensive and would likely require additional time/effort/expertise to commission.

BRIEF SUMMARY OF THE INVENTION

A lighting control approach as disclosed herein allows for a load or loads on a branch circuit to manipulate the current on the circuit such that an upstream current measuring/detection device can detect the variation or "signal" downstream and respond in a desired manner.

One aspect of a lighting control system and methods as disclosed herein is low production cost, in that such a configuration allows for an inexpensive transmitter in the controller and receivers in the ballasts/drivers of the respective lighting devices.

Another aspect of a lighting control system and methods as disclosed herein is low installation cost, in that such a configuration allows for a system that does not need additional control wires. The system may require little to no commissioning, in that it can be implemented using plug-and-play technology.

Another aspect of a lighting control system and methods as disclosed herein is visual confirmation wherein the predetermined pattern or "signature" on the mains lines that is created by a ballast or driver could be at a level that the changes in light level are visually discernable to the end-user. Such a configuration may provide the user with visual feedback that the system is functioning.

Still another aspect of a lighting control system and methods as disclosed herein is the lack of required RF or otherwise wireless communication.

In an embodiment of a lighting control system according to the present invention, the system is provided with a communication method utilizing downstream current modulation. A primary controller is electrically coupled to a plurality of lighting devices via a mains power transmission network. Each of the respective lighting devices includes an occupancy sensor and is configured to provide full illumination when occupancy is detected in the associated area. The controller identifies occupancy by an increase in current on the mains lines, directs the other devices to fully illuminate, and activates a timer. Prior to lapsing of the timer, any of the devices may indicate continued occupancy by adjusting an operating current to a respective light source according to a predetermined pattern. Upon identifying the pattern, the controller generates control signals directing each of the other devices to remain fully illuminated, and resets the timer. The predetermined pattern may for example include amplitude modulation, threshold numbers of cycles, or both.

DETAILED DESCRIPTION OF THE INVENTION

Referring generally to FIGS. 4-7, various exemplary embodiments of a lighting control system according to the present invention may now be described in detail. Where the various figures may describe embodiments sharing various common elements and features with other embodiments, similar elements and features are given the same reference numerals and redundant description thereof may be omitted below.

Figure 4:
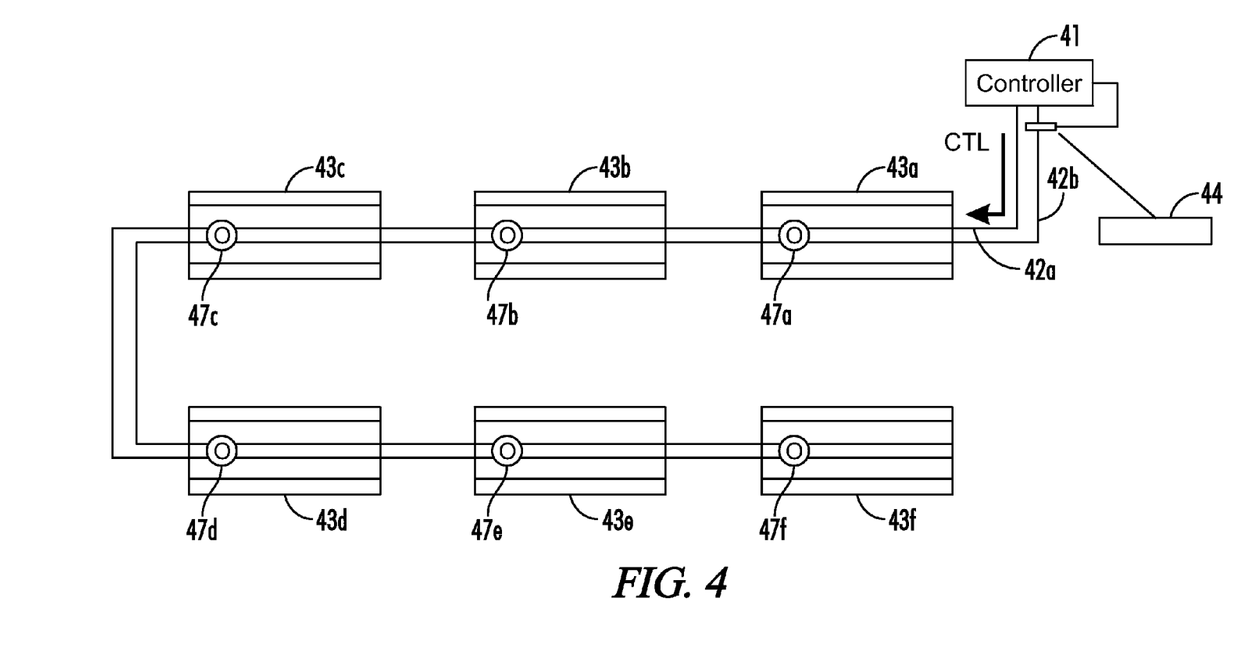
FIG. 4 is a block diagram representing an embodiment of a lighting control system as disclosed herein.

Referring first to FIG. 4, one embodiment of a lighting control system 40 as disclosed herein includes a primary controller 41 electrically coupled to a branch circuit including a plurality of lighting devices such as light fixtures 43a-43f via at least first and second wires 42, 42b in a mains power transmission network. A current sensor 44 is coupled to at least one of the mains wires and is coupled to the controller 41 to provide feedback regarding the mains current waveform. The aforementioned embodiment may be implemented in any collective area supporting multiple lighting devices, as may be disposed across a plurality of independently defined lighting areas (such as a parking garage).

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 5:
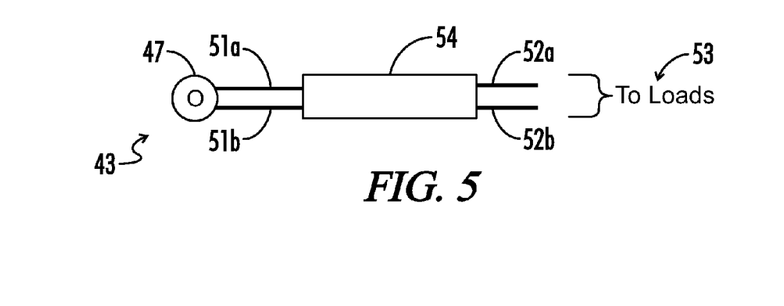
FIG. 5 is a block diagram representing an embodiment of a lighting device of the system of FIG. 4.
Figure 6:
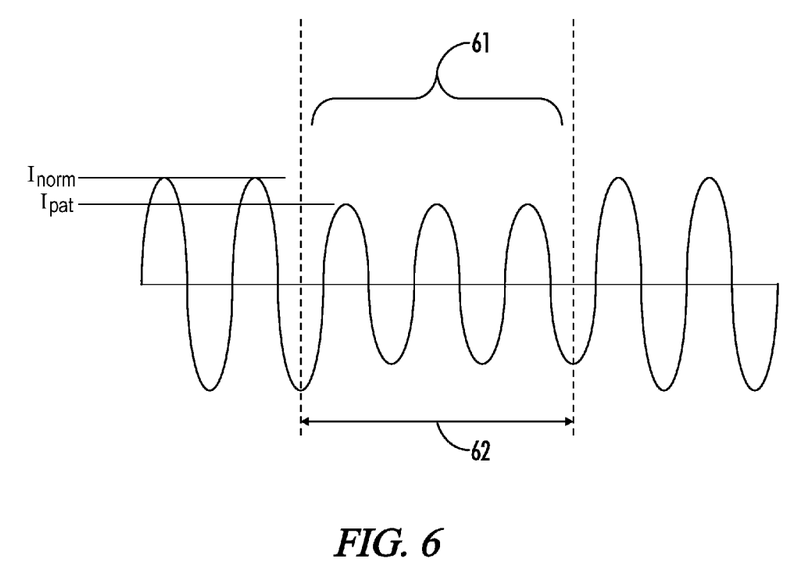
FIG. 6 is a graphical diagram representing an exemplary current waveform modulated according to a predetermined pattern as disclosed herein.

As represented in FIG. 5, the light fixtures 43 may typically include a power converter or power conversion circuit 54 configured to convert the mains input power into appropriate output power distributed across output wires 52a, 52b for operating an associated load 53. In one example, the power converter may include a controllable electronic ballast as is known in the art for providing a regulated AC output to a fluorescent light source, HID light source, etc. In another example, the power converter may include a controllable driver circuit as is known in the art for providing a regulated DC output to an array of light-emitting diodes (LED's) such as may be disposed in series, parallel or combination thereof.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art, and within the context of an input and output power as required for the associated load.

As represented in FIG. 5, the fixtures 43 are each further connected to one or more occupancy sensors 47 which are configured to detect movement and/or sound within the associated defined area. The occupancy sensors 47 provide control signals across wires 51a, 51b to the respective controllable power converter 54, wherein an output current to the light source, and accordingly a lighting output for the light fixture, is regulated based on at least an occupancy status for the defined area.

In an embodiment as disclosed in FIG. 4, the primary controller 41 is present at the front-end of the circuit branch. In alternative embodiments, the controller may be positioned anywhere along the mains transmission network wherein the controller is capable of measuring current on the branch and of sending signals over the power line to the associated light fixtures.

Figure 7:
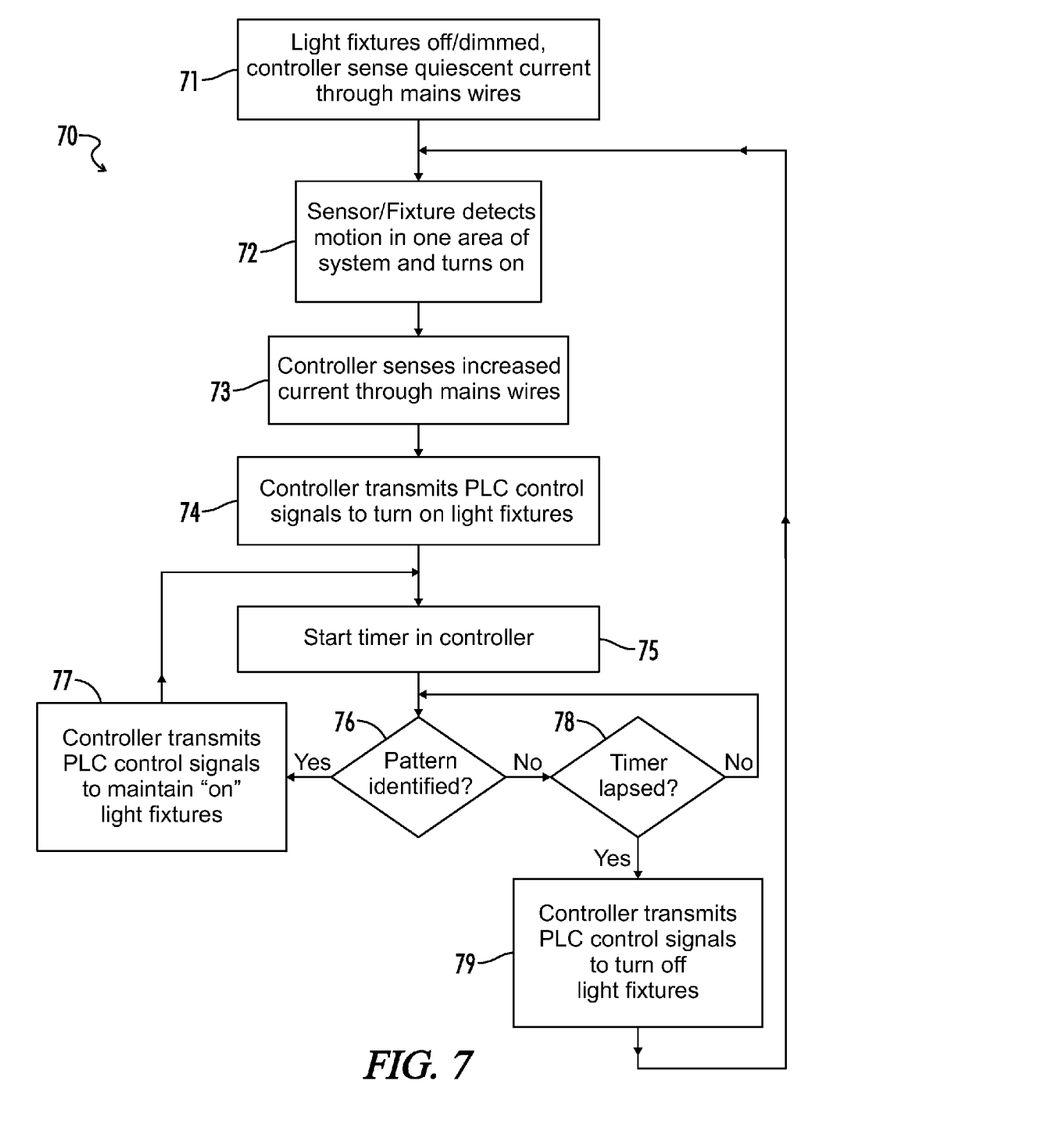
FIG. 7 is a flowchart representing an embodiment of a lighting control method as disclosed herein.

Referring next to FIG. 7, an embodiment of a lighting control method 70 may be described. In an unoccupied state with respect to the collective defined area, each of the fixtures may be turned off or dimmed (step 71). For the purposes of the following discussion, a fixture which is "off" or "dim" may be associated with a first occupancy state. In other embodiments, there may be one or more intermediate lighting stages wherein a light fixture is completely off in a first stage, dimmed to a particular level or range of levels in association with a second stage, etc., depending on for example an ambient light level for the respective defined area, user preferences, or the like. However, generally speaking it may be understood that within the scope of an invention as disclosed herein, the lighting control system is configured to produce a first lighting output in accordance with an unoccupied state. The lighting control system may further be considered as producing a second lighting output (e.g., full or 100% lighting output, or alternatively a lighting output of less than 100% but noticeably greater than that of the first lighting output) in accordance with an occupied state.

The controller senses the mains current waveform over time, and therefore the quiescent current of the unoccupied state is known by the controller. As long as the mains current waveform remains in the quiescent state, or at least within a range of current output associated with the quiescent state, the controller may be configured to take no subsequent action but merely continue to monitor the current waveform.

When a person or vehicle enters the covered space, one or more of the occupancy sensors will be tripped and the associated light fixture will turn on, or transition lights to full bright if previously dimmed (step 72). The controller will sense the increase in current (step 73) and send one or more control signals via the mains wires to all light fixtures on the branch to turn on, or turn lights to full bright if previously dimmed (step 74).

Processes and associated interface components by which such power line communications may be implemented between the controller and the various light fixtures are readily apparent to one of skill in the art, but may in one example include the creation of disturbances such as notches on the mains power signal, and the provision of interface processors and digital-to-analog circuitry effective to translate the notches, or more particularly their detected presence or absence at various stages of a data bit string, into a local control signal corresponding to a desired lighting level for the respective light fixture. For example, the presence of a notch at a zero crossing of the AC power signal may represent a "one" while the absence of a notch at the zero crossing of the AC power signal may represent a "zero". Upon receiving these data bits, the interface circuit may group these ones and zeroes into a bit word that represents the lighting level and creates an associated control signal for the, e.g., ballast or LED driver.

In an embodiment of the lighting control system as disclosed herein, a configurable timer may be activated in the controller (step 75). For this example, we may assume the timer is set to thirty minutes, but various alternative durations are considered as within the scope of an invention as described herein.

In one base scenario, the individual occupying the space may subsequently leave the area. If no other activity takes place, or otherwise no occupancy is detected within the space prior to lapsing of the timer (i.e., "no" in response to the query in step 76), the timer in the controller expires (i.e., "yes" in response to the query in step 78), and the controller will signal the fixtures, via the power line, to return to the off/dim lighting state (step 79).

Figure 8:
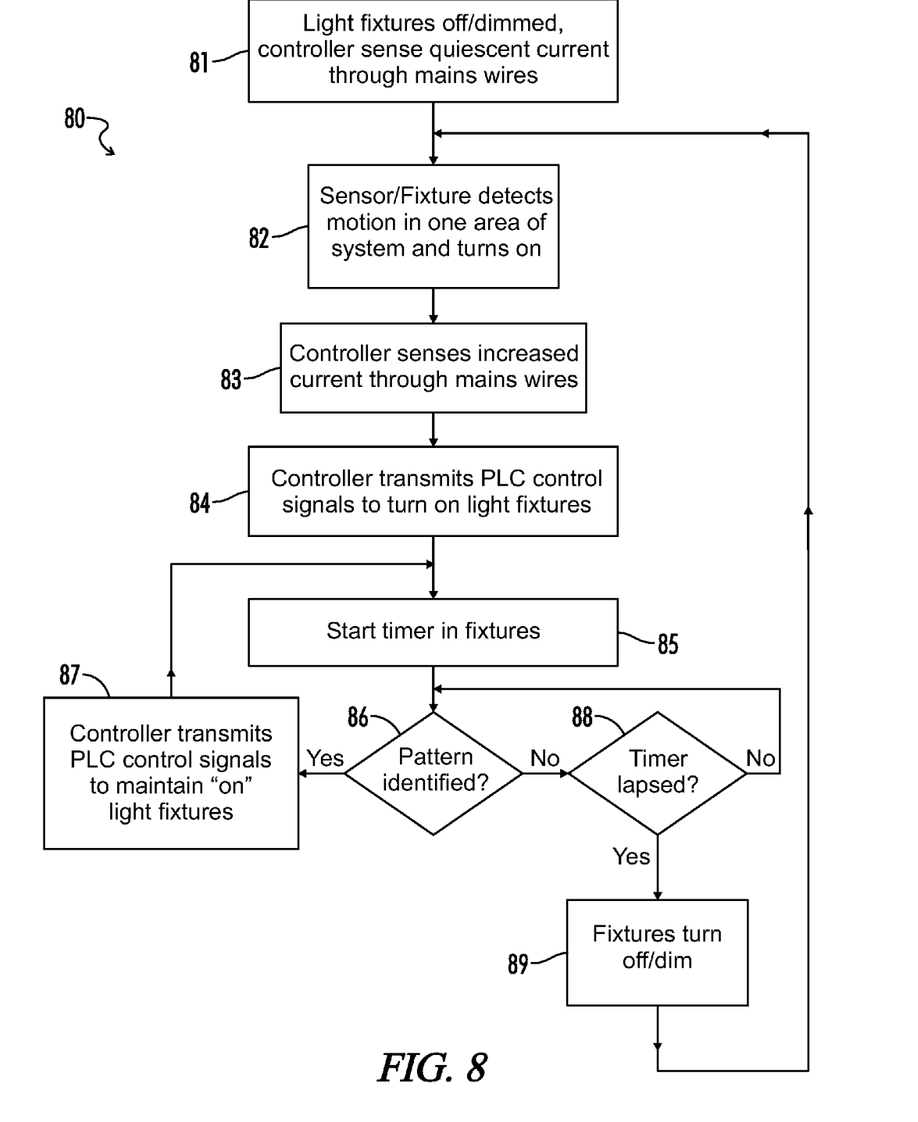
FIG. 8 is a flowchart representing another embodiment of a lighting control method as disclosed herein.

In an alternative embodiment of a method 80 as illustrated in FIG. 8, timers may be provided in each of the light fixtures, either in place of or to supplement the time in the controller. Steps 81-84 and 86-88 may be equivalent to those previously described with respect to the method 70 in FIG. 7, but in step 85 the timers are instead initiated in each of the light fixtures. In this embodiment, the controller may not need to signal the fixtures to turn off or dim, but the fixtures may instead be configured to automatically turn off or dim upon lapsing of the timer and without receiving a signal to stay on and reset the timer (step 89).

In one potential scenario, wherein the lighting control system as described herein is not fully employed, the individual or vehicle (or another individual or vehicle) may still occupy the covered area. The controller and occupancy sensors, with exception of the one(s) covering the area occupied, will time-out and the surrounding fixtures will turn off (or dim). A moment later, the controller will see that the current did not return to the quiescent level and send the signal for all other fixtures on the branch to turn on (or go to full bright). This approach, while potentially acceptable, results in undesired transition of the system—a relatively short on and off switching of the surrounding lights.

In accordance with certain methods as described herein, the individual or vehicle (or another individual or vehicle) may be identified as still occupying the covered area. In this case, when the occupancy sensor covering this area nears the end of the time-out period (perhaps the final 15 seconds), the sensor manipulates the control of the ballast or drivers in a predictable and predetermined pattern that results in a current draw "signature" on the line. This signature is subsequently detected upstream by the controller (i.e., "yes" in response to the query in step 76). The controller then initiates a new power line signal informing the drivers to remain on and the timer in the controller is reset (step 77 in FIG. 7), and/or the timers in the various light fixtures are reset (step 87 in FIG. 8). This process continues until the space is unoccupied.

The predetermined pattern 61 as implemented to produce the identifiable signature could take on many different forms depending on the application. As one example, with reference to FIG. 6, the normal operating current $I_{norm}$ may have a first amplitude wherein an operating current $I_{pat}$ corresponding to the predetermined pattern may have a second (e.g., reduced) amplitude. The predetermined pattern may be periodically imposed for at least a threshold duration 62, wherein for example the controller only identifies the pattern when a threshold amplitude has been exceeded for at least a threshold number of cycles.

In certain embodiments, the predetermined pattern or "signature" on the mains lines that is created by the ballast or driver could be at a level that the changes in light level are visually discernable to the end-user. Such a configuration may provide the user with visual feedback that the system is functioning properly.

In certain embodiments, a plurality of predetermined patterns may be identifiable by the controller and implemented by one or more of the light fixtures in accordance with a like number of lighting conditions as may be desirable for a particular application.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting control system for controlling a plurality of lighting devices via a mains power transmission network, wherein each of the plurality of lighting devices is disposed within a respective one of a plurality of defined areas and associated with one or more occupancy sensors configured to determine an occupancy status for the respective defined area, the lighting control system comprising:
   a primary controller configured to be electrically coupled to each of the plurality of lighting devices via the mains power transmission network; and
   the primary controller is configured to identify a predetermined pattern of a current adjustment and to generate and send corresponding control signals for each of the plurality of lighting devices via the mains power transmission network, and generate control signals directing each of the plurality of lighting devices to illuminate upon identifying a change from a first occupancy status to a second occupancy status,
   wherein the primary controller is further configured to activate a timer having a defined duration upon identifying the change from the first occupancy status to the second occupancy status,
   wherein at least one of the plurality of lighting devices includes local control circuitry configured to determine a local condition of continued occupancy for the respective defined area prior to lapsing of the defined timer duration, and adjust an operating current to a respective light source according to a corresponding predetermined pattern,
   wherein the primary controller is configured to generate control signals directing each of the plurality of lighting devices to maintain illumination of the respective light sources upon identifying said predetermined pattern via the mains power transmission network.

2. The lighting control system of claim 1, wherein the predetermined pattern corresponding to continued occupancy for the respective defined area prior to lapsing of the defined timer duration comprises at least a threshold amount of change in current amplitude.

3. The lighting control system of claim 2, wherein the predetermined pattern comprises the change in current amplitude for at least a threshold number of cycles.

4. The lighting control system of claim 2, wherein the threshold amount of change in current amplitude corresponds to a visually identifiable change in lighting output from the respective lighting device.

5. The lighting control system of claim 1, wherein the primary controller is configured to generate control signals directing each of the plurality of lighting devices to turn off upon lapsing of the timer without identifying said predetermined pattern via the mains power transmission network.

6. The lighting control system of claim 1, wherein the one or more occupancy sensors associated with each of the respective lighting devices comprise an IR sensor, a sound detector, or a combination thereof.

7. The lighting control system of claim 1, wherein one or more of the respective lighting devices comprise an electronic ballast configured to provide AC power for operating one or more associated light sources.

8. The lighting control system of claim 1, wherein one or more of the respective lighting devices comprise an LED driver configured to provide DC power for driving one or more associated light sources.

9. A lighting control system comprising:
a controller electrically coupled to each of a plurality of lighting devices and a current sensor via a mains power transmission network, wherein the controller is further configured to
identify a first type of change in current as representative of new occupancy within a defined area associated with at least one of the lighting devices;
identify a second type of change in current as representative of continued occupancy within the defined area;
responsive to either of the first type and the second type of change in current, to generate and send control signals via the mains power transmission network directing each of the plurality of lighting devices to turn on or remain on.

10. The lighting control system of claim 9, wherein the controller is further configured to activate a timer having a defined duration upon identifying the first type of change in current.

11. The lighting control system of claim 10, wherein the second type of change in current comprises a predetermined pattern identified in the current waveform via the mains power transmission network and prior to lapsing of the the defined timer duration.

12. The lighting control system of claim 11, wherein the predetermined pattern comprises at least a threshold amount of change in current amplitude.

13. The lighting control system of claim 12, wherein the predetermined pattern comprises the change in current amplitude for at least a threshold number of cycles.

14. The lighting control system of claim 12, wherein the threshold amount of change in current amplitude corresponds to a visually identifiable change in lighting output from the respective lighting device.

15. The lighting control system of claim 11, wherein the primary controller is configured to generate control signals directing each of the plurality of lighting devices to turn off upon lapsing of the timer without identifying said predetermined pattern via the mains power transmission network.

16. A lighting control method for a plurality of lighting devices coupled to a mains power transmission network, the method comprising:
sensing changes in a current waveform via the mains power transmission network;
identifying an increase in current as representative of new occupancy within a defined area associated with at least one of the lighting devices;
upon identifying the increase in current, activating a timer having a defined duration and directing each of the plurality of lighting devices to turn on or remain on;
prior to lapsing of the defined timer duration, identifying a predetermined pattern of change in the current waveform as representative of continued occupancy within the defined area;
responsive to the predetermined pattern of change in the current waveform, resetting the timer and directing each of the plurality of lighting devices to remain on.

17. The lighting control method of claim 16, wherein the predetermined pattern comprises at least a threshold amount of change in current amplitude and for at least a threshold number of cycles.

18. The lighting control system of claim 16, further comprising directing each of the plurality of lighting devices to turn off upon lapsing of the timer without identifying said predetermined pattern via the mains power transmission network.

* * * * *